United States Patent
Yoshihara

(10) Patent No.: US 8,428,468 B2
(45) Date of Patent: Apr. 23, 2013

(54) POLARIZATION MULTIPLEXING OPTICAL TRANSMISSION SYSTEM, POLARIZATION MULTIPLEXING OPTICAL RECEIVER AND POLARIZATION MULTIPLEXING OPTICAL TRANSMISSION METHOD

(75) Inventor: Tomoki Yoshihara, Tokyo (JP)

(73) Assignee: Nec Corporation, Tokyo (JP)

( * ) Notice: Subject to any disclaimer, the term of this patent is extended or adjusted under 35 U.S.C. 154(b) by 144 days.

(21) Appl. No.: 13/151,843

(22) Filed: Jun. 2, 2011

(65) Prior Publication Data

US 2011/0318005 A1    Dec. 29, 2011

(30) Foreign Application Priority Data

Jun. 24, 2010  (JP) .................................. 2010-143670

(51) Int. Cl.
 *H04B 10/00*  (2006.01)

(52) U.S. Cl.
 USPC ........................... 398/152; 398/184; 398/205

(58) Field of Classification Search ................. 398/152, 398/182–184, 203–205
 See application file for complete search history.

(56) References Cited

U.S. PATENT DOCUMENTS

| | | | | |
|---|---|---|---|---|
| 8,086,109 | B2 * | 12/2011 | Yuki et al. | 398/152 |
| 8,155,533 | B2 * | 4/2012 | Nakamoto | 398/184 |
| 2008/0232816 | A1 * | 9/2008 | Hoshida et al. | 398/152 |
| 2010/0135676 | A1 * | 6/2010 | Katagiri | 398/204 |
| 2010/0239267 | A1 * | 9/2010 | Kikuchi | 398/156 |

FOREIGN PATENT DOCUMENTS

JP    2008263590 A    10/2008

\* cited by examiner

*Primary Examiner* — Dzung Tran

(57) ABSTRACT

A polarization multiplexing optical receiver according to the invention includes a polarization splitting unit receiving polarization multiplexed lights which are modulated according to a first input signal and a second input signal including respective identifier, and splitting the polarization multiplexed light into a first polarized received light and a second polarized received light, a pair of photoelectric conversion units, a demodulation unit performing symbol recognition about the first received signal and the second received signal, and outputting a first demodulated signal and a second demodulated signal, an identifier detecting unit detecting the identifiers from the first demodulated signal and the second demodulated signal, and a delay compensation unit calculating a delay difference between the first demodulated signal and the second demodulated signal based on the identifiers, and inserting delay time corresponding to the delay difference into the first demodulated signal or the second demodulated signal.

8 Claims, 4 Drawing Sheets

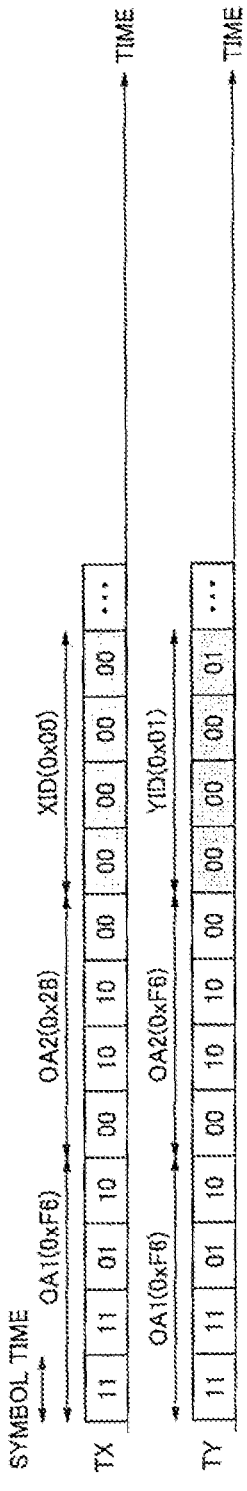
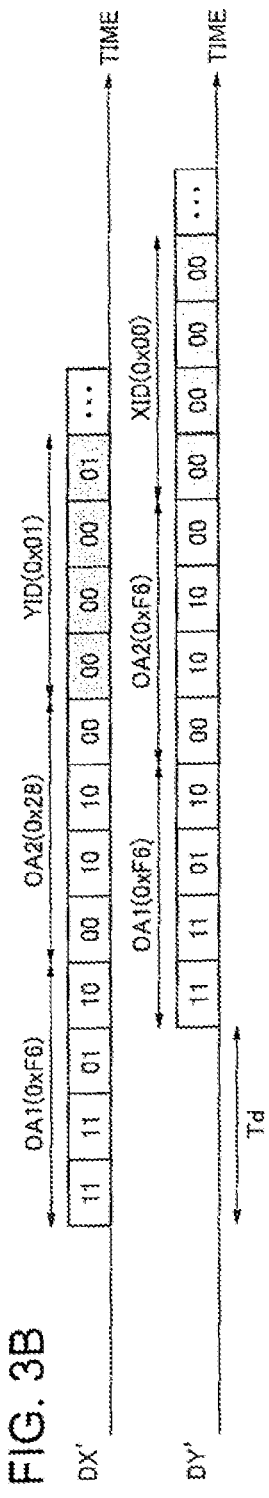
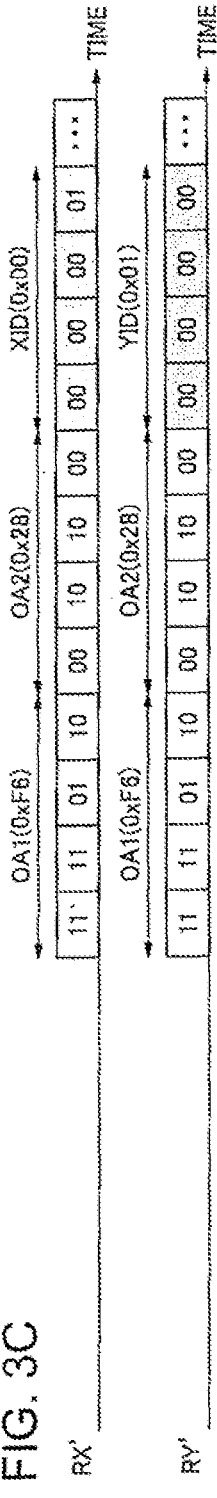

POLARIZATION MULTIPLEXING OPTICAL TRANSMISSION SYSTEM, POLARIZATION MULTIPLEXING OPTICAL RECEIVER AND POLARIZATION MULTIPLEXING OPTICAL TRANSMISSION METHOD

This application is based upon and claims the benefit of priority from Japanese Patent Application No. 2010-143670, filed on Jun. 24, 2010, the disclosure of which is incorporated herein in its entirety by reference.

TECHNICAL FIELD

The present invention relates to polarization multiplexing optical transmission systems, polarization multiplexing optical receivers and polarization multiplexing optical transmission methods and, in particular, to a polarization multiplexing optical transmission system, a polarization multiplexing optical receiver and a polarization multiplexing optical transmission method, each of which is compatible with high-speed transmission rate.

BACKGROUND ART

Owing to increase in information transmission capacity in recent years, higher transmission speed is required for optical transmission systems. At present, research and development for ultra-high speed optical transmission systems with the transmission rate of 100 Gb/s has been advanced. In the ultra-high speed optical transmission system with transmission rate of 100 Gb/s, in order to maintain compatibility with the relay distance in the conventional optical transmission system, it is required to improve SNR (Signal to Noise Ratio) and the resistance to wavelength dispersion and polarization mode dispersion. Therefore, for the ultra-high speed optical transmission system realizing the transmission rate of 100 Gb/s, the method is thought to be predominant which demodulates the polarization multiplexing optical signal by means of the digital coherent system. As for the polarization multiplexing optical signals, for example, it is available to use the optical signals obtained by multiplexing a vertically polarized optical signal and a horizontally polarized optical signal, each of which is modulated according to quadrature-phase-shift-keying (QPSK).

An example of the optical transmission system using such polarization multiplexing optical signals is disclosed in Japanese Patent Application Laid-Open Publication No. 2008-263590. In this related polarization multiplexing optical transmission system, a polarization multiplexing optical transmitter modulates at least any one of the wavelength, the transmission timing, and the intensity of the light as a carrier wave, by using predetermined pilot signal which can be recognized between the polarization multiplexing optical transmitter and the polarization multiplexing optical receiver. The polarization multiplexing optical receiver extracts a component of the predetermined pilot signal from a separated polarization component, and separates the polarization multiplexing signals by controlling their polarization states so that the intensity of this component may become either maximum or minimum.

SUMMARY

An exemplary object of the invention is to provide a polarization multiplexing optical transmission system, a polarization multiplexing optical receiver and a polarization multiplexing optical transmission method, each of which is able to regenerate an ultra-high speed optical signal in the polarization multiplexing optical transmission system, even if the delay difference arises between these polarization optical signals when receiving the polarization multiplexing optical signal and demultiplexing it into each polarization optical signal.

A polarization multiplexing optical transmission system according to an exemplary aspect of the invention includes a polarization multiplexing optical transmitter, a polarization multiplexing optical receiver, and an optical transmission path connecting the polarization multiplexing optical transmitter and the polarization multiplexing optical receiver, wherein the polarization multiplexing optical transmitter includes a pair of identifier adding units adding identifiers to a first input signal and a second input signal, respectively, so as to differentiate between the first input signal and the second input signal, a pair of modulator units modulating a first polarization light and a second polarization light according to the first input signal and the second input signal, respectively, and outputting a first polarized transmission light and a second polarized transmission light, respectively; and a polarization multiplexing unit multiplexing the first polarized transmission light and the second polarized transmission light, and transmitting a polarization multiplexed light obtained thereby to the optical transmission path, and wherein the polarization multiplexing optical receiver includes a polarization splitting unit splitting the polarization multiplexed light received through the optical transmission path into a first polarized received light and a second polarized received light, a pair of photoelectric conversion units converting the first polarized received light and the second polarized received light into respective electric signals and outputting a first received signal and a second received signal, a demodulation unit performing symbol recognition about the first received signal and the second received signal, and outputting a first demodulated signal and a second demodulated signal, an identifier detecting unit detecting the identifiers from the first demodulated signal and the second demodulated signal, and a delay compensation unit calculating a delay difference between the first demodulated signal and the second demodulated signal based on the identifiers, and inserting delay time corresponding to the delay difference into the first demodulated signal or the second demodulated signal.

A polarization multiplexing optical receiver according to an exemplary aspect of the invention includes a polarization splitting unit receiving a polarization multiplexed light obtained by multiplexing a first polarized transmission light and a second polarized transmission light which are modulated according to a first input signal and a second input signal including respective identifier to differentiate between the first input signal and the second input signal, and splitting the polarization multiplexed light into a first polarized received light and a second polarized received light, a pair of photoelectric conversion units converting the first polarized received light and the second polarized received light into respective electric signals and outputting a first received signal and a second received signal, a demodulation unit performing symbol recognition about the first received signal and the second received signal, and outputting a first demodulated signal and a second demodulated signal, an identifier detecting unit detecting the identifiers from the first demodulated signal and the second demodulated signal, and a delay compensation unit calculating a delay difference between the first demodulated signal and the second demodulated signal based on the identifiers, and inserting delay time corresponding to the delay difference into the first demodulated signal or the second demodulated signal.

A polarization multiplexing optical transmission method according to an exemplary aspect of the invention includes the steps of adding identifiers to a first input signal and a second input signal, respectively, so as to differentiate between the first input signal and the second input signal, modulating a first polarization light according to the first input signal, and outputting a first polarized transmission light, modulating a second polarization light according to the second input signal, and outputting a second polarized transmission light, multiplexing the first polarized transmission light and the second polarized transmission light to obtain a polarization multiplexed light, splitting the polarization multiplexed light into a first polarized received light and a second polarized received light, converting the first polarized received light and the second polarized received light into respective electric signals and outputting a first received signal and a second received signal, performing symbol recognition about the first received signal and the second received signal, and forming a first demodulated signal and a second demodulated signal, detecting the identifiers from the first demodulated signal and the second demodulated signal, and calculating a delay difference between the first demodulated signal and the second demodulated signal based on the identifiers, and inserting delay time corresponding to the delay difference into the first demodulated signal or the second demodulated signal.

BRIEF DESCRIPTION OF THE DRAWINGS

Exemplary features and advantages of the present invention will become apparent from the following detailed description when taken with the accompanying drawings in which:

FIG. 3 is a timing diagram illustrating the operation of the polarization multiplexing optical transmission system in accordance with the first exemplary embodiment of the present invention; FIG. 3A is a timing diagram of transmission data TX with an X-axis polarization and transmission data TY with a Y-axis polarization in the transmitting side; FIG. 3B is a timing diagram of received data DX' and DY' after polarization demultiplexing by means of a digital signal processing unit in the receiving side; FIG. 3C is a timing diagram of received data RX' and RY' which the polarization multiplexing optical receiver outputs.

EXEMPLARY EMBODIMENTS

Exemplary embodiments of the present invention will be described with reference to drawings as follows.

Exemplary Embodiment 1

Figure 1:
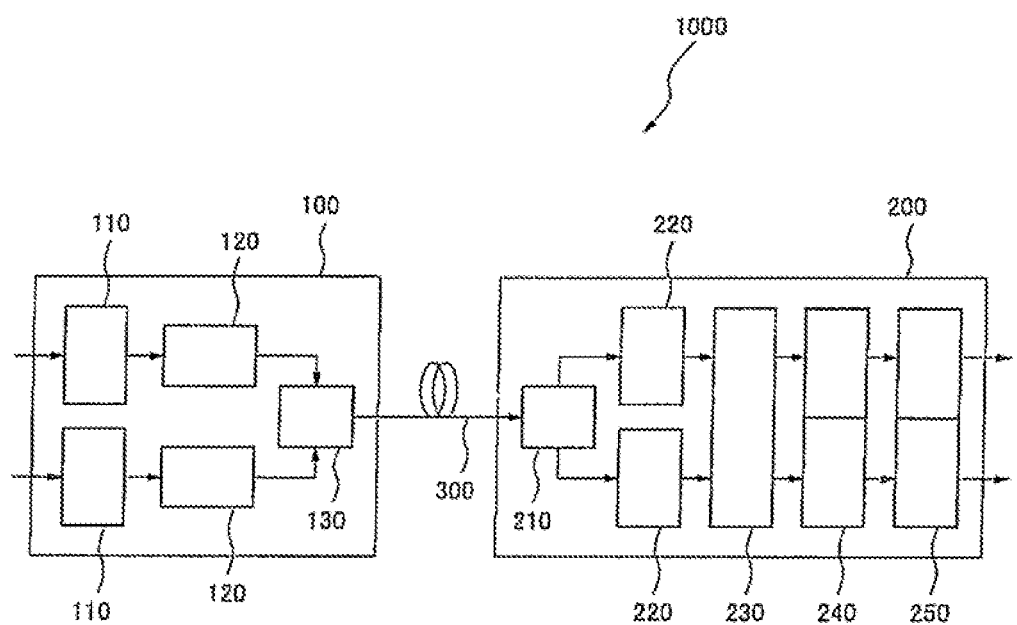
FIG. 1 is a block diagram showing the configuration of a polarization multiplexing optical transmission system in accordance with a first exemplary embodiment of the present invention.

FIG. 1 is a block diagram showing the configuration of a polarization multiplexing optical transmission system 1000 in accordance with a first exemplary embodiment of the present invention. The polarization multiplexing optical transmission system 1000 includes a polarization multiplexing optical transmitter 100 and a polarization multiplexing optical receiver 200, and they are connected to each other through an optical transmission path 300.

The polarization multiplexing optical transmitter 100 includes a pair of identifier adding units 110, a pair of modulator units 120 and a polarization multiplexing unit 130. The identifier adding units 110 add identifiers to a first input signal and a second input signal, respectively. These identifiers differentiate between the first input signal and the second input signal. The modulator units 120 output a first polarized transmission light into which a first polarization light is modulated according to the first input signal, and output a second polarized transmission light into which a second polarization light is modulated according to the second input signal, respectively. The polarization multiplexing unit 130 multiplexes the first polarized transmission light and the second polarized transmission light, and transmits the polarization multiplexed light to the optical transmission path 300. The first polarized transmission light and the second polarized transmission light are orthogonal to each other.

The polarization multiplexing optical receiver 200 includes a polarization splitting unit 210, a pair of photoelectric conversion units 220, a demodulation unit 230, an identifier detecting unit 240 and a delay compensation unit 250. The polarization splitting unit 210 splits the polarization multiplexed light received through the optical transmission path 300 into a first polarized received light and a second polarized received light. The photoelectric conversion units 220 convert the first polarized received light and the second polarized received light into electric signals, and output a first received signal and a second received signal, respectively. The demodulation unit 230 performs symbol recognition about the first received signal and the second received signal, and outputs a first demodulated signal and a second demodulated signal. The identifier detecting unit 240 detects the identifiers in the first demodulated signal and the second demodulated signal, respectively. The delay compensation unit 250 calculates the delay difference between the first demodulated signal and the second demodulated signal based on the identifiers, and inserts the delay time corresponding to the delay difference into the first demodulated signal or the second demodulated signal.

According to the polarization multiplexing optical transmission system 1000 in accordance with the present exemplary embodiment, the delay difference between the polarization optical signals caused by the polarization mode dispersion or the like can be detected, and thus it becomes possible to regenerate a polarization multiplexing ultra-high speed optical signals by canceling the above-mentioned delay difference.

Figure 2:
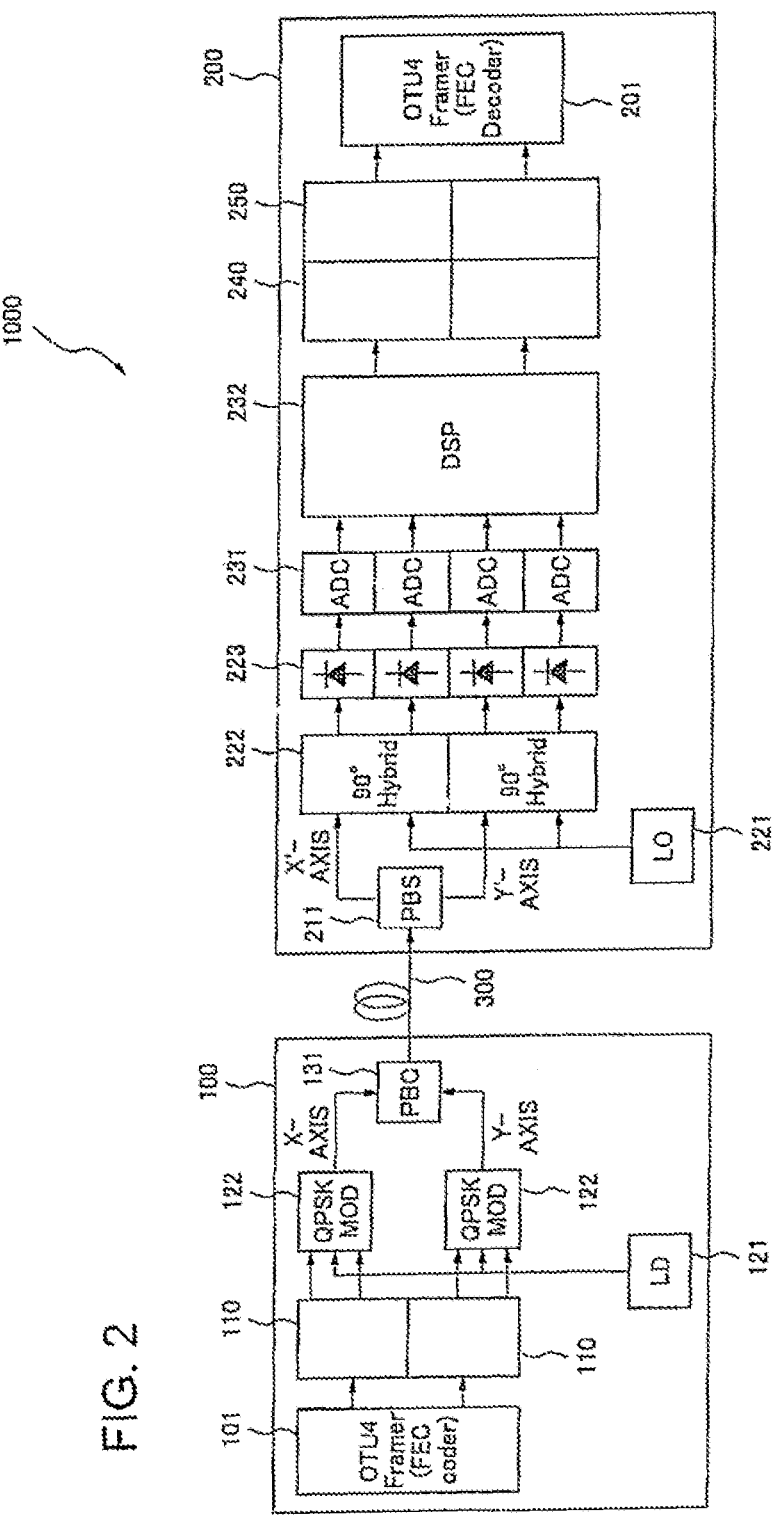
FIG. 2 is a block diagram showing the exemplary configuration of the polarization multiplexing optical transmission system in accordance with the first exemplary embodiment of the present invention.

Hereinafter, the polarization multiplexing optical transmission system 1000 in accordance with the present exemplary embodiment will be described more in detail. FIG. 2 is a block diagram showing the exemplary configuration of the polarization multiplexing optical transmission system 1000 in accordance with the first exemplary embodiment of the present invention. In this exemplary embodiment, an OTU4 (Optical-channel Transport Unit 4) signal is respectively used as the first input signal and the second input signal, which is a ultra-high speed signal of 100 Gb/s class standardized in ITU-T (International Telecommunications Union-Telecommunications). It will be described below that this OTU4 signal is transmitted by means of a polarization multiplexing QPSK modulation system.

First, the specific exemplary configuration of the polarization multiplexing optical transmitter 100 will be described. An OTU4 Framer unit 101 generates each OTU4 signal in which an error correction signal is added to a client signal such as 100 GbE signal or the like. The OTU4 Framer unit 101 is also called an FEC (Forward Error Correction) coder. Each of identifier adding units 110 adds an identifier to the generated OTU4 signal, respectively. At this time, the identifiers with the numerical values different from each other are added to the first input signal that modulates the vertical polarization light as the first polarization light and the second input signal that modulates the horizontal polarization light as the second polarization light, respectively.

A pair of QPSK modulation units 122 (QPSK MOD) perform the QPSK modulation for a CW (Continuous Wave) light output from a transmission light source 121 according to the first input signal and the second input signal, respectively. The QPSK modulation is independently carried out for each polarization light. As a result, the vertically polarized transmission light as the first polarized transmission light is obtained which has been modulated according to the first input signal, and the horizontally polarized transmission light as the second polarized transmission light is obtained which has been modulated according to the second input signal. In this configuration, the transmission light source 121 and the QPSK modulation unit 122 compose the modulator unit 120. The vertically polarized transmission light and the horizontally polarized transmission light are orthogonal to each other, and they are polarization-multiplexed by a polarization beam combiner (PBC) 131 as the polarization multiplexing unit 130, and then they are transmitted to the optical transmission path 300.

Next, the specific exemplary configuration of the polarization multiplexing optical receiver 200 will be described. The polarization multiplexing optical receiver 200 is configured such that the OTU4 signal is restored by taking out the signals from the vertically polarized received light and the horizontally polarized received light after polarization demultiplexing by means of a digital coherent reception system.

A polarization beam splitter (PBS) unit 211 as the polarization splitting unit 210 splits the polarization multiplexed light received through the optical transmission path 300 into the vertically polarized received light as the first polarized received light and the horizontally polarized received light as the second polarized received light, which are orthogonal to each other. Each split polarized received light is composed of the combination between the vertically polarized transmission light and the horizontally polarized transmission light due to the polarization mode dispersion or the like during the optical transmission. Each split polarized received lights interferes with a local light output from the local light source 221 in a 90°-hybrid unit 222, respectively. As a result, an optical complex amplitude signal including phase information of a main signal light is obtained for each polarized received light. The optical signal including those phase information is converted into electric signal in a photodetector unit 223. In this configuration, the local light source 221, the 90°-hybrid unit 222 and the photodetector unit 223 compose the photoelectric conversion unit 220.

An analog-to-digital converter (ADC) unit 231 converts the output signal of the photodetector unit 223 into the digital signal, and thereby digitized optical complex amplitude information is obtained. The received signal is generally composed of the combination between the vertically polarized signal and the horizontally polarized signal at the transmitting side. Therefore, a digital signal processing (DSP) unit 232 carries out a process for separating the received signal for each polarization at the transmitting side by means of the digital signal processing using CMA (Constant Modulus Algorithm) after extracting the clock signal. And then, the digital signal processing unit 232 decides on four values of the optical phase information in QPSK modulation by using the respective complex amplitude which is polarization-demultiplexed. That is, symbol recognition is performed by binarizing each polarization with in-phase information and with quadrature-phase information. In this configuration, the analog-to-digital converter (ADC) unit 231 and the digital signal processing unit 232 compose the demodulation unit 230.

The identifier detecting unit 240 detects the identifiers from the first demodulated signal and the second demodulated signal that is the information obtained by symbol recognition for each polarization. The identifier detecting unit 240 determines it based on the value of the identifier whether the polarization received light corresponds to either of the polarization lights at the transmitting side. Subsequently, the delay compensation unit 250 adds the delay time to the demodulated signal of each polarization received light according to the time difference between the arrival times of the identifiers, and cancels the delay difference between the polarization optical signals (hereinafter referred to as the skew difference between the polarizations). At this time, since it is generally known that the delay arising due to the polarization mode dispersion or the like fluctuates temporally, it is desirable that the delay compensation unit 250 is able to add the delay no smaller than the numerical value corresponding to the maximum compensation value for the skew difference between the polarizations. The OTU4 framer unit 201 executes the error correction process on each demodulated signal, and then regenerates the client signal. The OTU4 framer unit 201 is also called an FEC decoder unit.

As described above, the polarization multiplexing optical transmission system 1000 according to the present exemplary embodiment is characterized by including the identifier adding unit 110 in the transmitting side which adds the identifiers enabling to differentiate between the vertically polarized transmission light and the horizontally polarized transmission light. In the receiving side, the polarization multiplexing optical transmission system 1000 is characterized by including the identifier detecting unit 240 which detects the identifiers from the demodulated signal after the symbol recognition by means of the digital signal processing unit 232, and the delay compensation unit 250 which cancels the skew difference between the polarizations based on the detected identifiers.

Next, the operation of the polarization multiplexing optical transmission system 1000 according to the present exemplary embodiment will be described. FIG. 3 is a timing diagram illustrating the operation of the polarization multiplexing optical transmission system 1000. FIG. 3A is a timing diagram of transmission data TX with an X-axis polarization and transmission data TY with a Y-axis polarization in the transmitting side. FIG. 3B is a timing diagram of received data DX' and DY' after polarization demultiplexing by means of a digital signal processing unit in the receiving side. FIG. 3C is a timing diagram of received data RX' and RY' which the polarization multiplexing optical receiver outputs.

FIG. 3 shows an example where the data "0x00" is used as the numerical value of the identifier in the X-axis polarization (XID), and the data "0x01" is used as the numerical value of the identifier in the Y-axis polarization (YID). In order to specify the time slot position of each identifier, OA1 (0xF6) and OA2 (0x28), which are known as the synchronization overhead in the OTN (Optical Transport Network) or the like, are used in the present exemplary embodiment.

As shown in FIG. 3A, the X-axis polarization data and the Y-axis polarization data are transmitted simultaneously at the transmitting side. After the transmission data travel through the optical transmission path, the data on each polarized wave arrive at the receiving side with delay difference Td due to the polarization mode dispersion or the like. FIG. 3B shows the timing diagram at this time. FIG. 3B shows an example where the data on the polarized wave X' in the receiving side propagate faster by three symbols than the data on the polarized wave Y' in the receiving side, and the X-axis polarization and the Y-axis polarization in the transmitting side are interchanged each other when arriving at the receiving side. In the identifier detecting unit 240, the insertion positions of the identifiers can be recognized by using the general frame synchronization processing means, and furthermore, delay differences between the data on each polarized wave at the receiving side can be calculated from the arrival time difference of the identifiers. The delay compensation unit 250 adds the delay to each received data according to the delay difference at that time, and cancels the skew difference between the polarizations (FIG. 3C). At this time, since it is generally known that the delay arising due to the polarization mode dispersion or the like fluctuates temporally, it is desirable that the delay compensation unit 250 is able to add the delay no smaller than the numerical value corresponding to the maximum compensation value for the skew difference between the polarizations.

As described above, according to the polarization multiplexing optical transmission system 1000 in the present exemplary embodiment, even if the skew difference arises between the polarization multiplexing optical signals owing to the polarization mode dispersion or the like, the skew difference between the polarizations is able to be canceled at the receiving side. Therefore, it becomes possible to regenerate the polarization multiplexing ultra-high speed optical signals.

In the present exemplary embodiment, the data values are newly defined as the identifiers, but it is not limited to those cases. For example, in the case of using the OTN signal standardized in the ITU-T, it is possible to use, as the identifiers, the MFAS (Multi Frame Alignment Signal) for multi-frame synchronization, or the LLM byte of the OTN signal corresponding to the multi-lane optical signal.

Exemplary Embodiment 2

Figure 4:
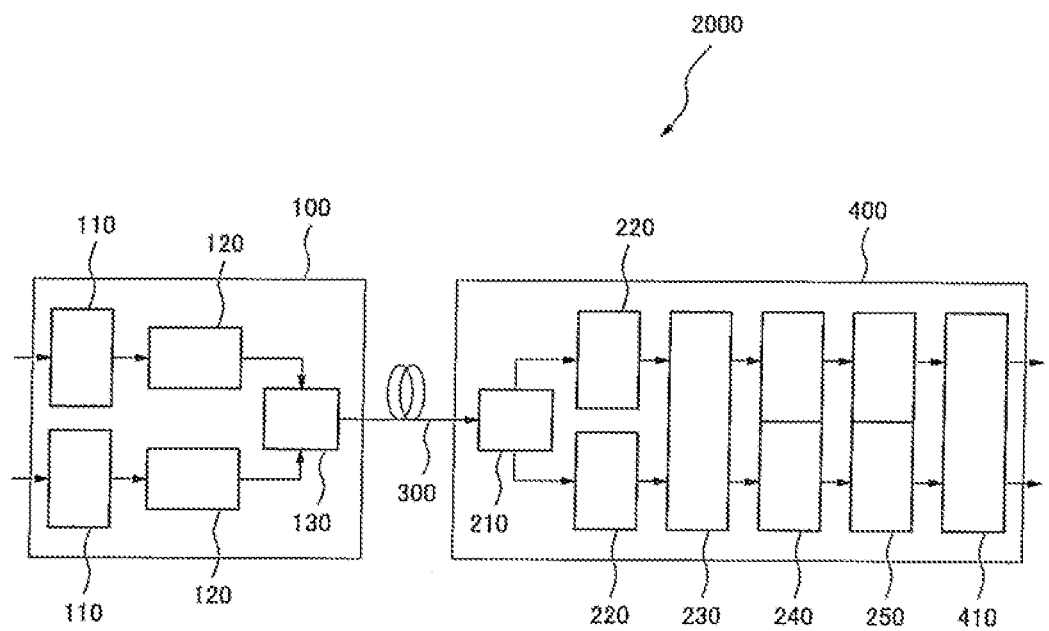
FIG. 4 is a block diagram showing the configuration of a polarization multiplexing optical transmission system in accordance with a second exemplary embodiment of the present invention.

Next, a second exemplary embodiment of the present invention will be described. FIG. 4 is a block diagram showing the configuration of a polarization multiplexing optical transmission system 2000 in accordance with the second exemplary embodiment of the present invention. The polarization multiplexing optical transmission system 2000 includes the polarization multiplexing optical transmitter 100 and a polarization multiplexing optical receiver 400, and they are connected to each other through the optical transmission path 300. In the polarization multiplexing optical transmission system 2000, the configuration of the polarization multiplexing optical receiver 400 is different from that of the polarization multiplexing optical receiver 200 disclosed in the first exemplary embodiment. The other configurations are the same as those in the first exemplary embodiment. Therefore, the descriptions of the other configurations are omitted hereinafter.

As shown in FIG. 4, the polarization multiplexing optical receiver 400 further includes a signal conversion unit 410 in addition to the configuration of the polarization multiplexing optical receiver 200 according to the first exemplary embodiment. The signal conversion unit 410 makes the first demodulated signal and the second demodulated signal correspond to the first input signal and the second input signal, respectively, based on the identifiers detected by the identifier detecting unit 240.

That is to say, the signal conversion unit 410 distinguishes the corresponding relation between the received light and the transmitted light by means of the values of the detected identifiers whether the first polarized received light and the second polarized received light are corresponding to the first polarized transmission light and the second polarized transmission light, respectively. In consequence, if the first polarization light and the second polarization light are interchanged to each other between the transmitting side and the receiving side, the signal conversion unit 410 performs such process that the first demodulated signal is made to correspond to the second input signal, and the second demodulated signal is made to correspond to the first input signal. FIG. 3B and FIG. 3C show the timing diagram at this time.

As mentioned above, according to the polarization multiplexing optical transmission system 2000 in the present exemplary embodiment, the first polarized transmission light and the second polarized transmission light in the transmitting side are correlated to the first polarized received light and the second polarized received light in the receiving side, and then the demodulated signals are able to be output. As a result, since the additional process for correlating the polarizations of the optical signals between the transmitting side and the receiving side is unnecessary, the equipment thereof is able to be simplified.

In the above-mentioned exemplary embodiments, the QPSK system is used as the modulation system for the signals in two streams which are polarization-multiplexed. However, the modulation system is not limited to it. The other multi-level modulation systems such as an 8-PSK (Phase Shift Keying) system and a 16-QAM (Quadrature Amplitude Modulation) system can be used.

In the related polarization multiplexing optical transmission system disclosed in the above-mentioned Japanese Patent Application Laid-Open Publication No. 2008-263590, even if the phases in the optical signals on the vertical polarization and the horizontal polarization are made to be in-phase and are multiplexed in the transmitting side, and then are transmitted to the receiving side, the delay difference arises between the vertical polarization optical signal and the horizontal polarization optical signal due to the polarization mode dispersion or the like in the optical transmission path. Therefore, in order to regenerate the original signals of 100 Gb/s at the receiving side, it is necessary to cancel the delay difference between these polarization optical signals.

In this way, in the related polarization multiplexing optical transmission system, because the delay difference arises between these polarization optical signals when the polarization multiplexing signals are received and separated into each polarization optical signal, there is a problem that it is difficult to regenerate the ultra-high speed optical signals.

An exemplary advantage according to the invention is that it becomes possible to regenerate the polarization multiplexed ultra-high speed optical signal.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. A polarization multiplexing optical transmission system, comprising:
    a polarization multiplexing optical transmitter;
    a polarization multiplexing optical receiver; and
    an optical transmission path connecting the polarization multiplexing optical transmitter and the polarization multiplexing optical receiver;
    wherein the polarization multiplexing optical transmitter includes
        a pair of identifier adding units adding identifiers to a first input signal and a second input signal, respectively, so as to differentiate between the first input signal and the second input signal;
        a pair of modulator units modulating a first polarization light and a second polarization light according to the first input signal and the second input signal, respectively, and outputting a first polarized transmission light and a second polarized transmission light, respectively; and
        a polarization multiplexing unit multiplexing the first polarized transmission light and the second polarized transmission light, and transmitting a polarization multiplexed light obtained thereby to the optical transmission path; and
    wherein the polarization multiplexing optical receiver includes
        a polarization splitting unit splitting the polarization multiplexed light received through the optical transmission path into a first polarized received light and a second polarized received light;
        a pair of photoelectric conversion units converting the first polarized received light and the second polarized received light into respective electric signals and outputting a first received signal and a second received signal;
        a demodulation unit performing symbol recognition about the first received signal and the second received signal, and outputting a first demodulated signal and a second demodulated signal;
        an identifier detecting unit detecting the identifiers from the first demodulated signal and the second demodulated signal; and
        a delay compensation unit calculating a delay difference between the first demodulated signal and the second demodulated signal based on the identifiers, and inserting delay time corresponding to the delay difference into the first demodulated signal or the second demodulated signal.

2. The polarization multiplexing optical transmission system according to claim 1,
    wherein the first polarized transmission light and the second polarized transmission light are orthogonal to each other, and the first polarized received light and the second polarized received light are orthogonal to each other.

3. The polarization multiplexing optical transmission system according to claim 1,
    wherein the polarization multiplexing optical receiver further includes a signal conversion unit making the first demodulated signal and the second demodulated signal correspond to the first input signal and the second input signal, respectively, based on the identifiers detected by the identifier detecting unit.

4. A polarization multiplexing optical receiver, comprising:
    a polarization splitting unit
        receiving a polarization multiplexed light obtained by multiplexing a first polarized transmission light and a second polarized transmission light which are modulated according to a first input signal and a second input signal including respective identifier to differentiate between the first input signal and the second input signal, and
        splitting the polarization multiplexed light into a first polarized received light and a second polarized received light;
    a pair of photoelectric conversion units converting the first polarized received light and the second polarized received light into respective electric signals and outputting a first received signal and a second received signal;
    a demodulation unit performing symbol recognition about the first received signal and the second received signal, and outputting a first demodulated signal and a second demodulated signal;
    an identifier detecting unit detecting the identifiers from the first demodulated signal and the second demodulated signal; and
    a delay compensation unit calculating a delay difference between the first demodulated signal and the second demodulated signal based on the identifiers, and inserting delay time corresponding to the delay difference into the first demodulated signal or the second demodulated signal.

5. The polarization multiplexing optical receiver according to claim 4, further comprising a signal conversion unit making the first demodulated signal and the second demodulated signal correspond to the first input signal and the second input signal, respectively, based on the identifiers detected by the identifier detecting unit.

6. The polarization multiplexing optical receiver according to claim 4,
    wherein the photoelectric conversion unit includes a local light source, a 90°-hybrid unit and a photodetector unit.

7. A polarization multiplexing optical transmission method, comprising the steps of:
    adding identifiers to a first input signal and a second input signal, respectively, so as to differentiate between the first input signal and the second input signal;
    modulating a first polarization light according to the first input signal, and outputting a first polarized transmission light;
    modulating a second polarization light according to the second input signal, and outputting a second polarized transmission light;
    multiplexing the first polarized transmission light and the second polarized transmission light to obtain a polarization multiplexed light;
    splitting the polarization multiplexed light into a first polarized received light and a second polarized received light;
    converting the first polarized received light and the second polarized received light into respective electric signals and outputting a first received signal and a second received signal;
    performing symbol recognition about the first received signal and the second received signal, and forming a first demodulated signal and a second demodulated signal;
    detecting the identifiers from the first demodulated signal and the second demodulated signal; and
    calculating a delay difference between the first demodulated signal and the second demodulated signal based on the identifiers, and inserting delay time corresponding to the delay difference into the first demodulated signal or the second demodulated signal.

8. The polarization multiplexing optical transmission method according to claim 7, further comprising:

making the first demodulated signal and the second demodulated signal correspond to the first input signal and the second input signal, respectively, based on the identifiers detected from the first demodulated signal and the second demodulated signal.

* * * * *